US008806132B2

(12) United States Patent  
Nishigaki

(10) Patent No.: US 8,806,132 B2  
(45) Date of Patent: Aug. 12, 2014

(54) INFORMATION PROCESSING DEVICE, MEMORY ACCESS CONTROL DEVICE, AND ADDRESS GENERATION METHOD THEREOF

(75) Inventor: Yasuhiro Nishigaki, Tokyo (JP)

(73) Assignee: NEC Corporation, Tokyo (JP)

( * ) Notice: Subject to any disclaimer, the term of this patent is extended or adjusted under 35 U.S.C. 154(b) by 249 days.

(21) Appl. No.: 13/352,802

(22) Filed: Jan. 18, 2012

(65) Prior Publication Data

US 2012/0226863 A1    Sep. 6, 2012

(30) Foreign Application Priority Data

Mar. 3, 2011    (JP) .................................. 2011-046596

(51) Int. Cl.
*G06F 12/00*    (2006.01)

(52) U.S. Cl.
USPC ............... 711/118; 711/5; 711/100; 711/150; 711/154; 711/168; 711/200; 711/210; 711/212; 711/E12.001

(58) Field of Classification Search
USPC ......... 711/100, 118, 150, 154, 168, 200, 210, 711/212, 5, E12.001
See application file for complete search history.

(56) References Cited

U.S. PATENT DOCUMENTS 6,799,252 B1 *    9/2004    Bauman ........................ 711/149

FOREIGN PATENT DOCUMENTS

| JP | 6-103491 A | 4/1994 |
| JP | 2000-148477 A | 5/2000 |
| JP | 2001-43210 A | 2/2001 |
| JP | 2002-342306 A | 11/2002 |
| JP | 3789316 B2 | 11/2002 |
| JP | 2006-18412 A | 1/2006 |

OTHER PUBLICATIONS

Office Action Dated Nov. 27, 2012, Issued by the Japanese Patent Office in Counterpart Japanese Application No. 2011-046596.

* cited by examiner

*Primary Examiner* — Midys Rojas
(74) *Attorney, Agent, or Firm* — Sughrue Mion, PLLC

(57) ABSTRACT

An information processing device according to the present invention includes an operation unit that outputs an access request, a storage unit including a plurality of connection ports and a plurality of memories capable of a simultaneous parallel process that has an access unit of a plurality of word lengths for the connection ports, and a memory access control unit that distributes a plurality access addresses corresponding to the access request received for each processing cycle from the operation unit, and generates an address in a port including a discontinuous word by one access unit for each of the connection ports.

10 Claims, 15 Drawing Sheets

|  | OPERATOR 0 | OPERATOR 1 | OPERATOR 2 | OPERATOR 3 | OPERATOR 4 | OPERATOR 5 | OPERATOR 6 | OPERATOR 7 |
|---|---|---|---|---|---|---|---|---|
| T0 | 0B | 8B | 16B | 24B | 32B | 40B | 48B | 56B |
| T1 | 64B | 72B | 80B | 88B | 96B | 104B | 112B | 120B |
| T2 | 128B | 136B | 144B | 152B | 160B | 168B | 176B | 184B |
| T3 | 192B | 200B | 208B | 216B | 224B | 232B | 240B | 248B |
| T4 | 256B | 264B | 272B | 280B | 288B | 296B | 304B | 312B |
| T5 | 320B | 328B | 336B | 344B | 352B | 360B | 368B | 376B |
| T6 | 384B | 392B | 400B | 408B | 416B | 424B | 432B | 440B |
| T7 | 448B | 456B | 464B | 472B | 480B | 488B | 496B | 504B |

Fig. 4

|  | CONNECTION PORT 0 | CONNECTION PORT 1 | CONNECTION PORT 2 | CONNECTION PORT 3 | CONNECTION PORT 4 | CONNECTION PORT 5 | CONNECTION PORT 6 | CONNECTION PORT 7 |
|---|---|---|---|---|---|---|---|---|
| T0 | 0B | 8B | 16B | 24B | 32B | 40B | 48B | 56B |
| T1 | 64B | 72B | 80B | 88B | 96B | 104B | 112B | 120B |
| T2 | 128B | 136B | 144B | 152B | 160B | 168B | 176B | 184B |
| T3 | 192B | 200B | 208B | 216B | 224B | 232B | 240B | 248B |
| T4 | 256B | 264B | 272B | 280B | 288B | 296B | 304B | 312B |
| T5 | 320B | 328B | 336B | 344B | 352B | 360B | 368B | 376B |
| T6 | 384B | 392B | 400B | 408B | 416B | 424B | 432B | 440B |
| T7 | 448B | 456B | 464B | 472B | 480B | 488B | 496B | 504B |
| T8 | | | | | | | | |
| T9 | | | | | | | | |
| T10 | | | | | | | | |
| T11 | | | | | | | | |
| T12 | | | | | | | | |
| T13 | | | | | | | | |
| T14 | | | | | | | | |

Fig. 5

| CONNECTION PORT 0 | | | | | | | |
|---|---|---|---|---|---|---|---|
| 0 | 64 | 128 | 192 | 256 | 320 | 384 | 448 |
| 512 | 576 | 640 | 704 | 768 | 832 | 896 | 960 |

| CONNECTION PORT 1 | | | | |
|---|---|---|---|---|
| 8 | 72 | 136 | •••• | 456 |
| 520 | 584 | 648 | •••• | 968 |

| CONNECTION PORT 7 | | | | |
|---|---|---|---|---|
| 56 | 120 | 184 | •••• | 504 |
| 568 | 632 | 696 | •••• | 1016 |

Fig. 6

| ADDRESS IN BANK | BANK | ADDRESS IN BLOCK |

Fig. 9

|  | OPERATOR 0 | OPERATOR 1 | OPERATOR 2 | OPERATOR 3 | OPERATOR 4 | OPERATOR 5 | OPERATOR 6 | OPERATOR 7 |
|---|---|---|---|---|---|---|---|---|
| T0 | 0B | 8B | 16B | 24B | 32B | 40B | 48B | 56B |
| T1 | 64B | 72B | 80B | 88B | 96B | 104B | 112B | 120B |
| T2 | 128B | 136B | 144B | 152B | 160B | 168B | 176B | 184B |
| T3 | 192B | 200B | 208B | 216B | 224B | 232B | 240B | 248B |
| T4 | 256B | 264B | 272B | 280B | 288B | 296B | 304B | 312B |
| T5 | 320B | 328B | 336B | 344B | 352B | 360B | 368B | 376B |
| T6 | 384B | 392B | 400B | 408B | 416B | 424B | 432B | 440B |
| T7 | 448B | 456B | 464B | 472B | 480B | 488B | 496B | 504B |

Fig. 13

| CONNECTION PORT 0 | | | | | | | |
|---|---|---|---|---|---|---|---|
| 0 | 8 | 16 | 24 | 32 | 40 | 48 | 56 |
| 512 | 520 | 528 | 536 | 544 | 552 | 560 | 568 |

| CONNECTION PORT 1 | | | | |
|---|---|---|---|---|
| 64 | 72 | 80 | ••••• | 120 |
| 576 | 584 | 592 | ••••• | 632 |

| CONNECTION PORT 7 | | | | |
|---|---|---|---|---|
| 448 | 456 | 464 | ••••• | 504 |
| 960 | 968 | 976 | ••••• | 1016 |

Fig. 14

| | CONNECTION PORT 0 | CONNECTION PORT 1 | CONNECTION PORT 2 | CONNECTION PORT 3 | CONNECTION PORT 4 | CONNECTION PORT 5 | CONNECTION PORT 6 | CONNECTION PORT 7 |
|---|---|---|---|---|---|---|---|---|
| T0 | 0B | | | | | | | |
| T1 | 8B | 64B | | | | | | |
| T2 | 16B | 72B | 128B | | | | | |
| T3 | 24B | 80B | 136B | 192B | | | | |
| T4 | 32B | 88B | 144B | 200B | 256B | | | |
| T5 | 40B | 96B | 152B | 208B | 264B | 320B | | |
| T6 | 48B | 104B | 160B | 216B | 272B | 328B | 384B | |
| T7 | 56B | 112B | 168B | 224B | 280B | 336B | 392B | 448B |
| T8 | | 120B | 176B | 232B | 288B | 344B | 400B | 456B |
| T9 | | | 184B | 240B | 296B | 352B | 408B | 464B |
| T10 | | | | 248B | 304B | 360B | 416B | 472B |
| T11 | | | | | 312B | 368B | 424B | 480B |
| T12 | | | | | | 376B | 432B | 488B |
| T13 | | | | | | | 440B | 496B |
| T14 | | | | | | | | 504B |

Fig. 15

INFORMATION PROCESSING DEVICE, MEMORY ACCESS CONTROL DEVICE, AND ADDRESS GENERATION METHOD THEREOF

INCORPORATION BY REFERENCE

This application is based upon and claims the benefit of priority from Japanese patent application No. 2011-046596, filed on Mar. 3, 2011, the disclosure of which is incorporated herein in its entirety by reference.

BACKGROUND OF THE INVENTION

1. Technical Field

The present invention relates to an information processing device, a memory access control device, and an address generation method thereof, and particularly to an information processing device that accesses to a storage unit with an access unit of a plurality of word lengths, a memory access control device, and an access generation method thereof.

2. Background Art

In recent years, many information processing devices (for example, processors) that realize improvement of computing power by performing parallel processing to data have been suggested. One of such information processing devices is a vector operation device. An example of a memory access method of a related art in this vector operation device is disclosed in Patent Application Publication No. H06-103491 and Japanese Patent No. 3789316.

Patent Application Publication No. H06-103491 discloses that when a word length of an operation unit and a word length of a main memory differ, throughput is reduced. Therefore, in Patent Application Publication No. H06-103491, by accessing to the main memory with a continuous plurality of words collectively, the performance is improved. However, when the word length of the operation unit and the word length of the main memory are different, following performance degradation is caused in the method of a related art that assigns continuous words of a plurality of continuous operation units to the words of the main memory.

Here, a technology of a related art is explained with Japanese Patent No. 3789316 as an example. Japanese Patent No. 3789316 is related to a routing address generation method of a vector processing device. Further, the vector operation device includes a vector operation unit, a storage unit, and a memory access control unit. The vector operation unit outputs a vector element, a top element address, and a distance between elements and makes an access request. The storage unit is composed of a plurality of memory banks that are capable of performing a simultaneous parallel process, and includes a plurality of connection ports. The memory access control unit performs access control independently for each connection port that connects the plurality of access requests to the storage unit between the vector operation unit and the storage unit.

Further, the memory access control unit includes an adder unit, an exclusive or circuit, a routing address generation unit, and a crossbar unit. The adder unit generates an access address of the access request for each vector element by addition of the top element address and the distance between elements that are transmitted from the vector operation unit. The exclusive or circuit obtains an exclusive or of a low-order one bit of the routing address, which is a part of the access address, and bits other than the routing address of the access address for each vector element. The routing address generation unit replaces an output of the exclusive or circuit with the low-order one bit of the routing address to generate a new routing address. A conflict arbitration unit performs conflict arbitration of the access requests for each connection port that connects to the storage unit according to the routing address generated by the routing address generation unit. The crossbar unit outputs the access request for each vector element according to the conflict arbitration of the conflict arbitration unit.

In the vector operation device disclosed in Japanese Patent No. 3789316, the above configuration can prevent conflict of the connection ports assigned to the access address generated for one access request, and improve access performance.

A DDR (Double Data Rate) DRAM (Dynamic Random Access Memory) is becoming the mainstream in recent years because of the improvement in the processing speed of the information processing device. In this DRAM, a burst access for continuously accessing to continuous addresses is performed, and an access unit is defined by bus width×the number of bursts. For example, the number of bursts is two in DDR, the number of bursts is four in DDR2, and the number of bursts is eight in DDR3. As DDR3 DIMM, which is becoming the mainstream at the moment, includes a bus width of 64 bits (8 bytes: hereinafter referred to as 8 B), when the number of bursts is eight, the access unit will be 64 B as eight pieces of 8 B data are continuously transferred. Specifically, the access unit increases by using a high-speed DDR DRAM. In this way, as the access unit of the main memory increases and is different from an access length of the operation unit, the performance for accessing the main memory is degraded.

An example of the access address issued by the vector operation unit to a general storage unit is shown in FIGS. 8 to 10. FIG. 8 shows a data structure of the access address in the case of specifying an address by an address of a block and an address in the block. FIG. 9 shows a data structure of the access address in the case of accessing the storage unit by a memory interleave. FIG. 10 shows a data structure of the access address in the case of accessing the storage unit with the direct mapping method.

Further, a cache may be provided in order to reduce the memory access time to the storage unit. In the information processing device, the access request to the storage unit is made by the access unit. Therefore, the access efficiency to the storage unit improves by registering all the data accessed in one access unit to the cache. Thus, the unit to manage the data on the cache (cache line width) is an integral multiple of this access unit. Note that the cache line width increases with the increase of the access unit.

In the memory access method of a related art, at least one of the access unit and the cache line width is treated as one block. At this time, when the cache is divided by the access unit, interleaved by the access unit, and data transfer is performed, there has been a problem of increasing the data width by one access unit and also the memory access time. Moreover, when the cache is divided by the cache line width and interleaved by each cache line width, and data transfer is performed, there has been a problem of increasing one cache line width and also the memory access time.

The abovementioned issue is explained more specifically. An example of the data structure of the access address used in the access to the main memory is shown in FIGS. 11 and 12. In this example, as shown in FIG. 11, the access address is composed of 24 bits. Then, an access line address in a port is defined to high-order 15 bits of the access address. Further, the routing address is defined to three bits (bits a9, a8, and a7) following the address in the port among the access address. Furthermore, as shown in FIG. 12, the address in the port is generated using the access line address in the port and the address in the access unit (bits a6 to a1) among the access addresses.

Additionally, FIG. 13 shows a timing chart of the access request output by the vector operation unit when the vector operation unit includes operators 0 to 7 and the operators 0 to 7 access to continuous words in one process cycle. In the example shown in FIG. 13, in a cycle T0, the vector operation unit outputs vector elements v0, v1, v2, v3, v4, v5, v6, and v7, a top element address 0 B, and a distance between elements 8 B as the access request. By making such access request, it becomes possible to efficiently access to the storage unit. In response to this access request, the memory access control unit of the vector operation device generates access addresses 0 B, 8 B, 16 B, 24 B, 32 B, 40 B, 48 B, and 56 B corresponding to the vector elements v0, v1, v2, v3, v4, v5, v6, and v7. FIG. 13 shows the access address generated by the memory access control unit for each operational timing.

The routing address generation unit of the memory access control unit selects the three bits in the access address as the routing addresses, as shown in FIG. 11. A request is sent to a cache unit 3 using the connection port specified by the routing address. For the access request of the timing T0, the routing addresses 0, 0, 0, 0, 0, 0, 0, and 0 are generated for the vector elements v0, v1, v2, v3, v4, v5, v6, and v7. That is, the crossbar unit processes access addresses 0 B, 8 B, 16 B, 24 B, 32 B, 40 B, 48 B, and 56 B generated in response to the access request of the timing T0 altogether in the connection port 0. Specifically, in the connection port 0, the vector elements v0, v1, v2, v3, v4, v5, v6, and v7 are processed in order.

Then, in the case in which the storage unit includes the connection ports 0 to 7 and the vector operation unit 10 includes the operators 0 to 7, the assignment of the access region of the storage unit accessed in accordance with the timing chart shown in FIG. 13 is shown in FIG. 14. As shown in FIG. 14, continuous words (words of 0th, 8th, 16th, . . . , and 56th byte) are stored to one access line width of the connection port of the storage unit of a related art. Additionally, continuous words are written inside one access line width of other connection ports.

Moreover, when the access request is made in accordance with the timing chart shown in FIG. 13, the routing addresses of 64 B, 72 B, 80 B, 88 B, 96 B, 104 B, 112 B, and 120 B, which are the access addresses of the vector elements v0, v1, v2, v3, v4, v5, v6, and v7 generated in response to the access request in timing T1 will be 1. That is, the routing addresses generated at the timing T1 will be 1, 1, 1, 1, 1, 1, 1, and 1. Accordingly, the access address generated in response to the access request of the timing T1 is processed using the connection port 1.

FIG. 15 shows a timing chart by the storage unit side in the case of accessing to the storage unit from the vector operation unit 10 in accordance with the abovementioned procedure. As shown in FIG. 15, the continuous words are assigned to one access unit in the access method of the related art. Further, in the access method, the continuous words are assigned to one cache line width. Then, in the accessing method of the related art, there is a period generated when the connection ports cannot be efficiently used, which is caused by the continuous words being assigned as above, and consequently generating a problem of increasing the access time.

SUMMARY

The present invention is made in light of the abovementioned problem, and aims to reduce the access time while using a storage unit with a plurality of word lengths as an access unit.

An exemplary object of the invention is to provide an information processing device that includes an operation unit which outputs an access request, a storage unit including a plurality of connection ports and a plurality of memories capable of a simultaneous parallel process that has an access unit of a plurality of word lengths, and a memory access control unit that distributes a plurality access addresses corresponding to the access request received for each processing cycle from the operation unit, and generates an address in a port including a discontinuous word by one access unit for each of the connection ports.

An exemplary aspect of the present invention is to provide a memory access control device, which includes an operation unit for outputting an access request, a storage unit including a plurality of connection ports and a plurality of memories capable of a simultaneous parallel process that has an access unit of a plurality of word lengths for the connection port, that generates an address in a port for each of the connection ports of the storage unit based on the access request between the operation unit and the storage unit. The memory access control device includes a routing address generation unit that generates a routing address for specifying the connection port to assign each of a plurality of access addresses corresponding to the access request, a conflict arbitration unit that performs conflict arbitration of the connection port to assign the access address based on the routing address, an address in port generation unit that generates the address in the port based on the access address input in a plurality of processing cycles, and a crossbar unit that assigns the address in the port to one of the plurality of connection ports according to a conflict arbitration process of the conflict arbitration unit.

Another exemplary aspect of the present invention is to provide an address generation method in an information processing device including an operation unit for outputting an access request and a storage unit including a plurality of connection ports and a plurality of memories capable of a simultaneous parallel process that has an access unit of a plurality of word lengths for the connection port. The address generation method includes generating the plurality of access addresses corresponding to the access request for each processing cycle of the operation unit and distributing the plurality of access addresses into the plurality of connection ports, and generating an address in a port including a discontinuous word belonging to a different processing cycle of the operation unit by one access unit for each of the connection ports.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 4 is a timing chart of an access request output by the information processing device according to the first exemplary embodiment;

FIG. 5 is a timing chart by the side of the storage unit of the information processing device according to the first exemplary embodiment;

FIG. 6 is a view showing assignment of the address region of the storage unit of the information processing device according to the first exemplary embodiment;

Figure 9:
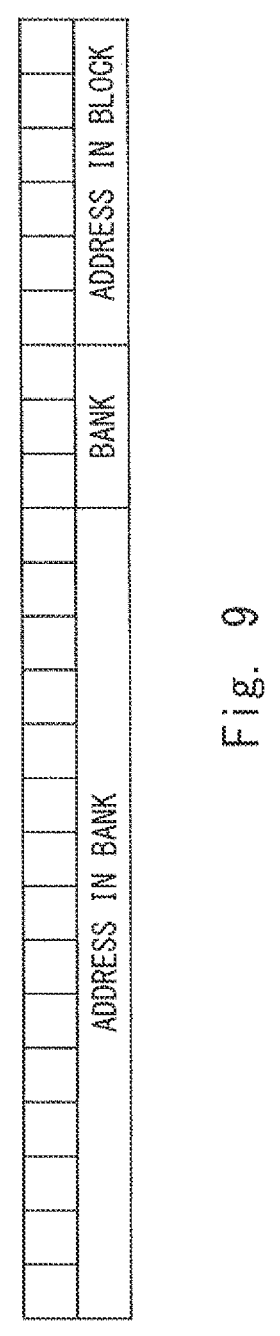

FIG. 9 is a view showing an example of a data structure of a general access address according to the related art;

FIG. 13 is a timing chart of an access request output by the vector operation unit of the related art;

FIG. 14 is a view showing assignment of the address region of the storage unit of the vector operation unit of the related art; and FIG. 15 is a timing chart by the side of the storage unit of the information processing device of the related art.

EXEMPLARY EMBODIMENT

[First Exemplary Embodiment]

Hereafter, exemplary embodiments of the invention are described with reference to the drawings. The following explanation explains a vector operation device as an example of an information processing device. However, the present invention is not limited to the vector operation device, but can be applied to a device that performs data transfer between an operator (CPU etc.) and a memory.

Figure 1:
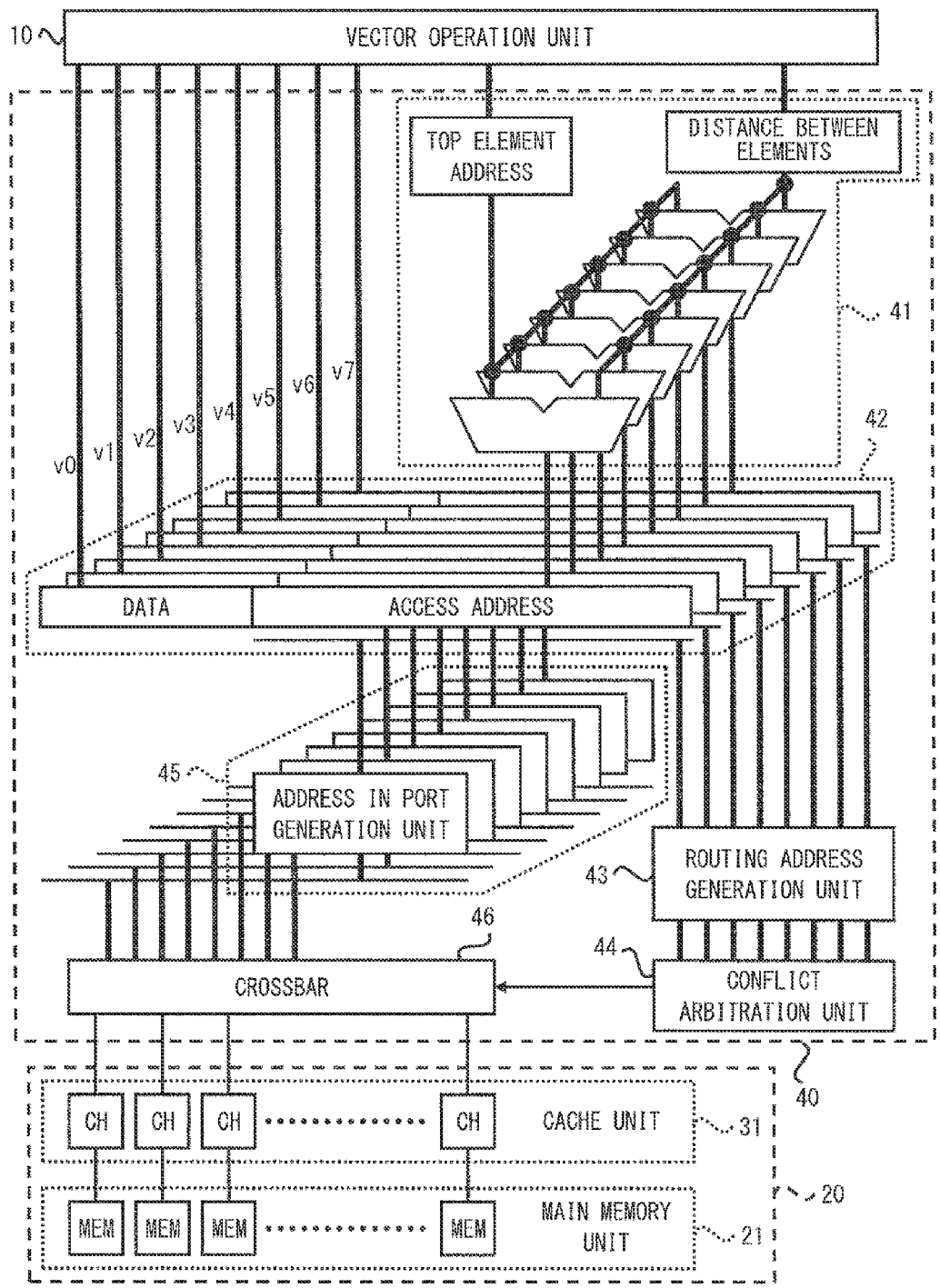
FIG. 1 is a block diagram of an information processing device according to a first exemplary embodiment.

First, a block diagram of an information processing device according to this exemplary embodiment is shown in FIG. 1. As shown in FIG. 1, an information processing device 1 includes a vector operation unit 10, a storage unit 20, and a memory access control unit 40. Note that in the information processing device shown in FIG. 1, the storage unit 20 is composed of a main memory unit 21 and a cache unit 31. Note that the storage unit 20 includes a plurality of connection ports and a plurality of memories that are capable of simultaneous parallel process, and an access is made to the connection ports by the access unit of a plurality of word lengths.

Note that in this exemplary embodiment, in order to explain simply, a case is explained as an example in which the number of the vector elements capable of simultaneous processes is eight, the number of the connection ports to the storage unit 20 is eight, the access unit to the storage unit 20 is eight words, and the cache line width is eight words.

The vector operation unit 10 is equivalent to the operation unit in the present invention. The vector operation unit 10 outputs an access request according to the process. Specifically, the vector operation unit 10 outputs eight vector elements v0 to v7, a top element address, and a distance between elements in one processing cycle, and makes a request for each vector element.

The main memory unit 21 includes a plurality of memories (for example, memory blocks MEM) which are capable of simultaneous parallel process. This memory block MEM is provided for each connection port. The main memory unit 21 includes eight connection ports, stores data processed in the vector operation unit 10, and accesses to the memory are performed.

The cache unit 31 is provided for each connection port, and stores the data at least greater than or equal to the one access unit to one cache line width. In this cache unit 31, a plurality of pieces of data assigned to discontinuous words are stored to one cache line (which is indicated as a cache CH in the example of FIG. 1). In the example shown in FIG. 1, as the number of connection ports is eight, the main memory unit 21 includes eight memory blocks MEM, and the cache unit 31 also includes eight caches CH. Then, one memory block MEM and one cache CH are connected to one connection port.

Note that the memory block MEM in the main memory unit 21 performs a process to data for eight words in one access, and reads and writes data of desired words among the data for eight words. This one access shall be performed in eight processing cycles. Further, the cache CH inside the cache unit 31 performs a process to the data for eight words in a similar manner as the memory block MEM, and reads and writes the data of desired words among the data for eight words. This one access shall be performed in eight processing cycles. That is, the plurality of connection ports of the cache unit 31 are accessed in parallel from the memory access control unit 40.

The memory access control unit 40 distributes a plurality of access addresses corresponding to the access request received for each processing cycle from the vector operation unit 10 into the plurality of connection ports, and generates, for each connection port, an address in the port including discontinuous words belonging to a different processing cycle of the vector operation unit 10 by one access unit.

Moreover, the memory access control unit 40 includes an address generation unit 41, an address register 42, a routing address generation unit 43, a conflict arbitration unit 44, an address in port generation unit 45, and a crossbar unit 46. The address generation unit 41 generates eight access addresses based on the top element address and distance information between elements. Then, the eight access addresses are stored to a predetermined region of the address register 42. In addition to the access address, the address register 42 stores the vector elements v0 to v7. The routing address generation unit 43 generates a routing address that specifies the connection port for assigning the access address. That is, the routing address generation unit 43 generates the routing address that specifies the port to transmit a request for each element according to the access address. The conflict arbitration unit 44 performs conflict arbitration of the connection ports that assign each of the plurality of access addresses based on the routing address. That is, the conflict arbitration unit 44 performs conflict arbitration that determines the request for each element transmitted for each port based on the routing address. The address in port generation unit 45 generates the address in the port based on the access address input in a plurality of processing cycles. That is, the address generation unit 45 in the port generates the address in the port that specifies the address in each port according to the access address for each element. The crossbar unit 46 assigns the address in the port to one of the plurality of connection ports according to the conflict arbitration process of the conflict arbitration unit 44. That is, the crossbar unit 46 outputs the request for each element to each connection port according to the conflict arbitration of the conflict arbitration unit 44.

Figure 2:
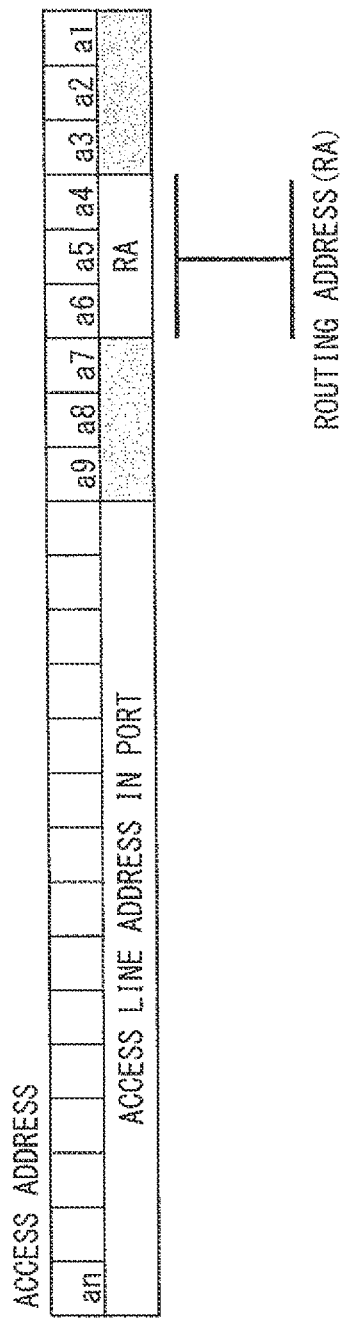
FIG. 2 is a view showing a data structure of an access address processed in the information processing device according to the first exemplary embodiment.
Figure 3:
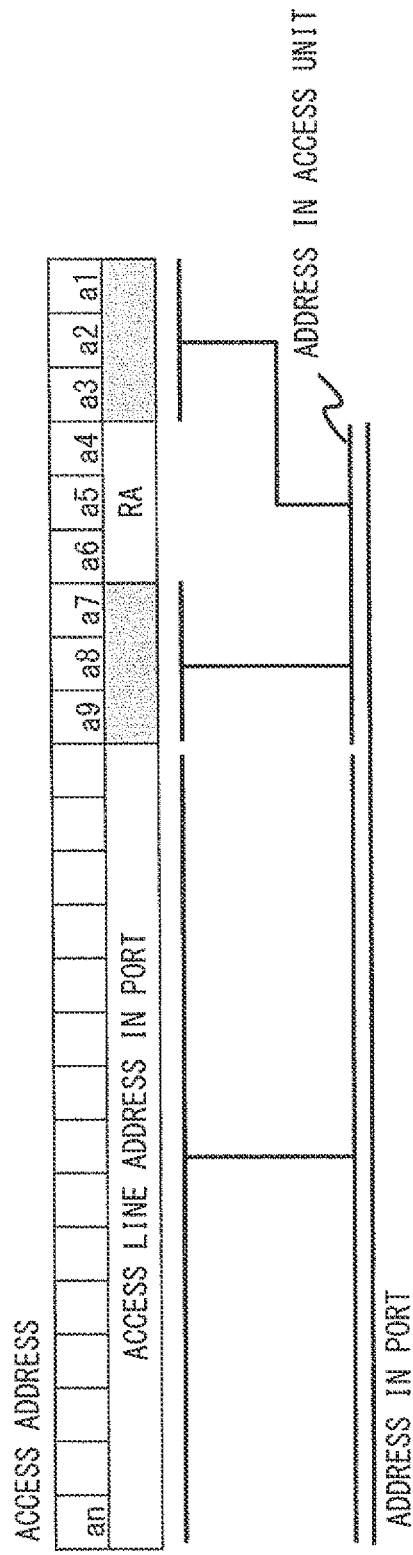
FIG. 3 is a view showing a data structure of an access address processed in the information processing device according to the first exemplary embodiment.

Next, an operation of the information processing device 1 according to the first exemplary embodiment is explained. First, the generation procedure of the access address, the routing address, and the address in the port in the information processing device 1 is explained. In the information processing device 1, these addresses are generated in the memory access control unit 40. The address generation unit 41 of the memory access control unit 40 generates the access address in an adder unit that adds the top element address and the distance between elements. That is, the address generation unit 41 adds the top element address and the distance between elements and generates the access address. In the first exemplary embodiment, when there is an access request of the vector elements v0, v1, v2, v3, v4, v5, v6, and v7, a top element address 0 B, and a distance between elements 8 B, as the access addresses, 0 B, 8 B, 16 B, 24 B, 32 B, 40 B, 48 B, and 56 B are generated. FIGS. 2 and 3 show the data structure of the access address. Note that FIG. 2 is a view for explaining the generation of the routing address. FIG. 3 is a view for explaining the generation of the address in the port. As shown in FIGS. 2 and 3, the access line address in the port is defined as high-order bits other than a9 to a1 among the access addresses.

Next, an operation of the routing address generation unit 43 is explained using FIG. 2. The routing address generation unit 43 generates the routing address based on three bits, a6, a5, and a4 of the access address.

Further, an operation of the address in port generation unit 45 is explained using FIG. 3. The address in port generation unit 45 generates the address in the port by the access line address in the port, a9 to a7, and a3 to a1 except a6 to a4 which are used for generating the routing address. Note that six bits, which are a9 to a7 and a3 to a1, of the access address indicate the addresses in the access unit.

Next, an operation of the entire information processing device 1 is explained. When the vector operation unit 10 sequentially processes an array of 8 B data from the top element, the distance between elements will be 8 B. The operation in this case is explained using the timing charts of FIGS. 4 and 5. The top element address shall be 0 B as an example. First, FIG. 4 shows a timing chart of the access request output from the vector operation unit 10 of the information processing device 1 according to the first exemplary embodiment. FIG. 4 shows the words in which the vector operation unit 10 makes the access request for each processing cycle (each timing of the timings T0 to T7) of the vector operation unit 10. Further, FIG. 4 is an example of the vector operation unit including the operators 9 to 7. As shown in FIG. 4, the vector operation unit 10 makes the access request for continuous eight words in one processing cycle.

The memory access control unit 40 generates the address in the port which is assigned with discontinuous words per access unit for the access request shown in FIG. 4. Specifically, when the vector operation unit 10 outputs the vector elements v0 to v7, the top element address 0 B, and the distance between elements 8 B and makes the access request at a timing T0 of FIG. 4, the address generation unit 41 generates 0 B, 8 B, 16 B, 24 B, 32 B, 40 B, 48 B, and 56 B as the access addresses corresponding to each of the vector elements v0 to V7. The access address is stored to the address register 42. Then, the routing address generation unit 43 generates routing addresses 0, 1, 2, 3, 4, 5, 6, and 7 based on the access address for each element stored to the address register 42. According to this routing address, as the conflict of the connection ports is not generated by the access request at the timing TO, the conflict arbitration unit 44 makes assignment indication of the connection ports to the crossbar unit 46 according to this routing address.

Then, the address in port generation unit 45 generates the address in the port based on the access address for each element stored to the address register 42. The crossbar unit 46 distributes the addresses in the port corresponding to the vector elements v0 to v7 to the connection ports 0 to 7 according to the arbitration result of the conflict arbitration unit 44.

The memory access control unit 40 respectively performs the abovementioned operation to the access request output in each processing cycle. Accordingly, the addresses in the port generated sequentially in time for one connection port by the memory access control unit 40 are for the discontinuous words. That is, the access unit defined for each connection port is composed of the address in the port including the discontinuous words. FIG. 5 shows a timing chart by the side of the storage unit 20 of the information processing device. As shown in FIG. 5, discontinuous words are assigned to each of the connection ports 0 to 7. Further, it can be seen that the discontinuous word is assigned to one access unit. Furthermore, as shown in FIG. 5, in the information processing device 1 according to the first exemplary embodiment, it can be seen that the connection ports are effectively used in the access to the storage unit 20, there is no deviation in the access start and access end for each connection port, and the access time for all data is completed in one access unit.

Such assignment of the address region of the storage unit 20 accessed by the memory access control unit 40 is shown in FIG. 6. As shown in FIG. 6, in the storage unit 20 of the information processing device 1 according to the exemplary embodiment, the discontinuous words are stored to the address region corresponding to one connection port. In other words, continuous words are stored to adjacent connection ports. This is because that the memory access control unit 40 assigns discontinuous words by one access unit of one connection port. Further, as shown in FIG. 6, the discontinuous words are assigned to one cache line width (for example, one line of the address region of the connection port of FIG. 6).

From the abovementioned explanation, in the information processing device 1 according to the first exemplary embodiment, when one access unit is access of a plurality of words in the memory access control unit 40, the address in the port assigned with discontinuous words is generated for the one access unit. Moreover, the memory access control unit 40 distributes the plurality of access addresses generated correspondingly to the access request of one processing cycle respectively to different connection ports.

Accordingly, the information processing device 1 according to the first exemplary embodiment prevents unused state from being generated in the usage state of the connection ports in any operational cycle, and improves the utilization efficiency of the connection ports. Further, the information processing device 1 according to the first exemplary embodiment improves the utilization efficiency of the connection ports, and thereby reducing the access time between the vector operation unit 10 and the storage unit 20. For example, when the access time of the information processing device 1 according to the first exemplary embodiment shown in FIG. 5 is compared with the access time in the example of the related art shown in FIG. 15 corresponding to the same access request shown in FIG. 5, the information processing device 1 according to the first exemplary embodiment completes the access half the time of the example of the related art.

[Second Exemplary Embodiment]

Figure 7:
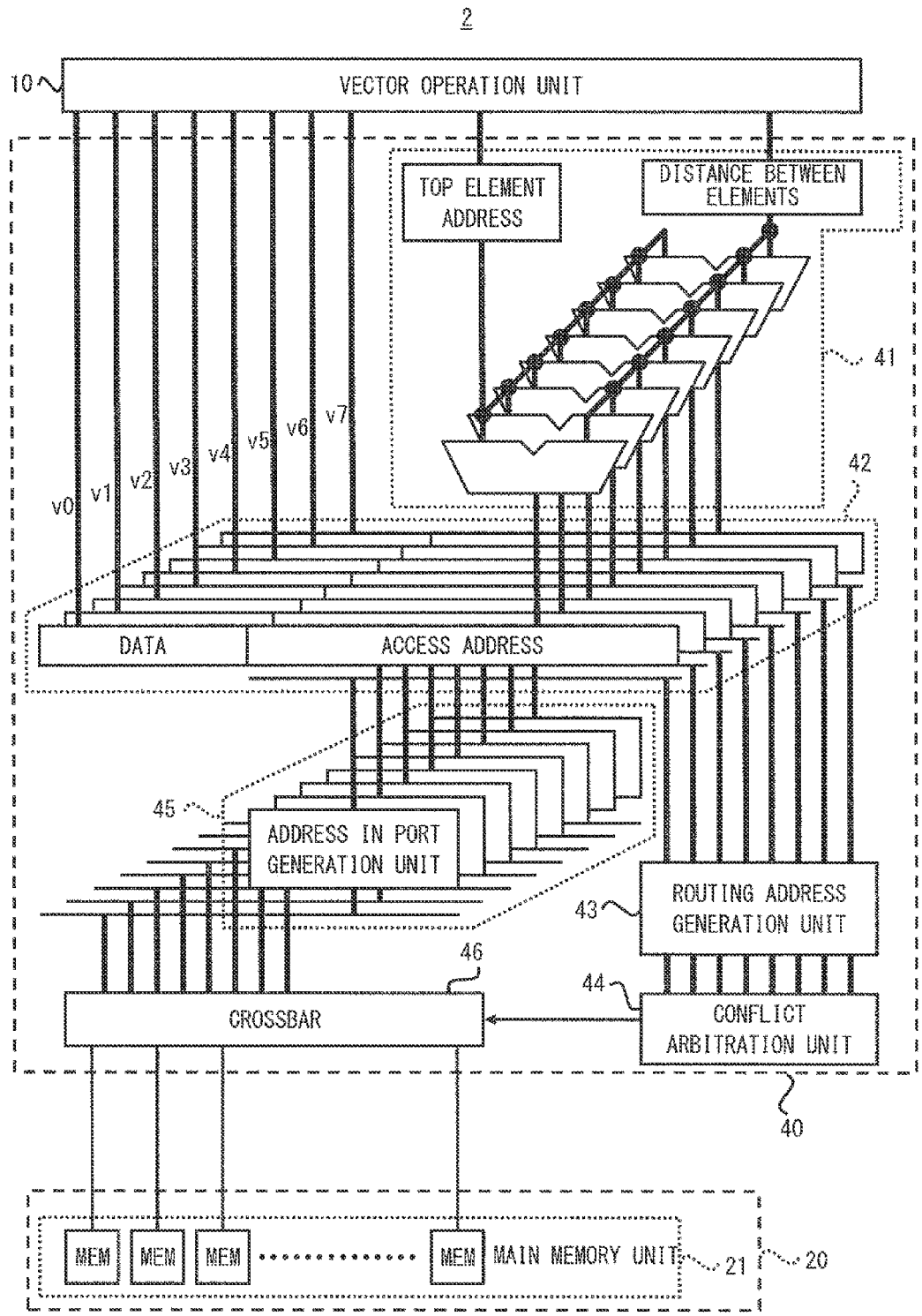
FIG. 7 is a block diagram of an information processing device according to a second exemplary embodiment.
Figure 8:
FIG. 8 is a view showing an example of a data structure of a general access address according to a related art.
Figure 10:
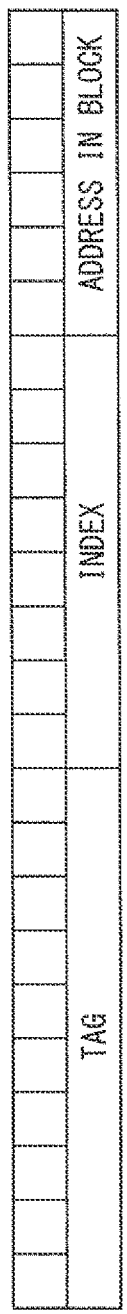
FIG. 10 is a view showing an example of a data structure of a general access address according to the related art.
Figure 11:
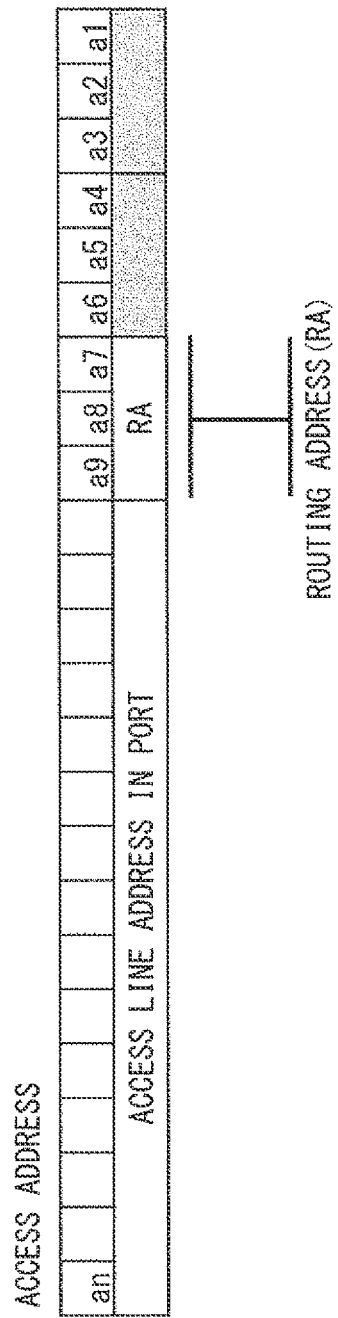
FIG. 11 is a view showing an example a data structure of an access address when a vector operation unit of a related art accesses to the storage unit.
Figure 12:
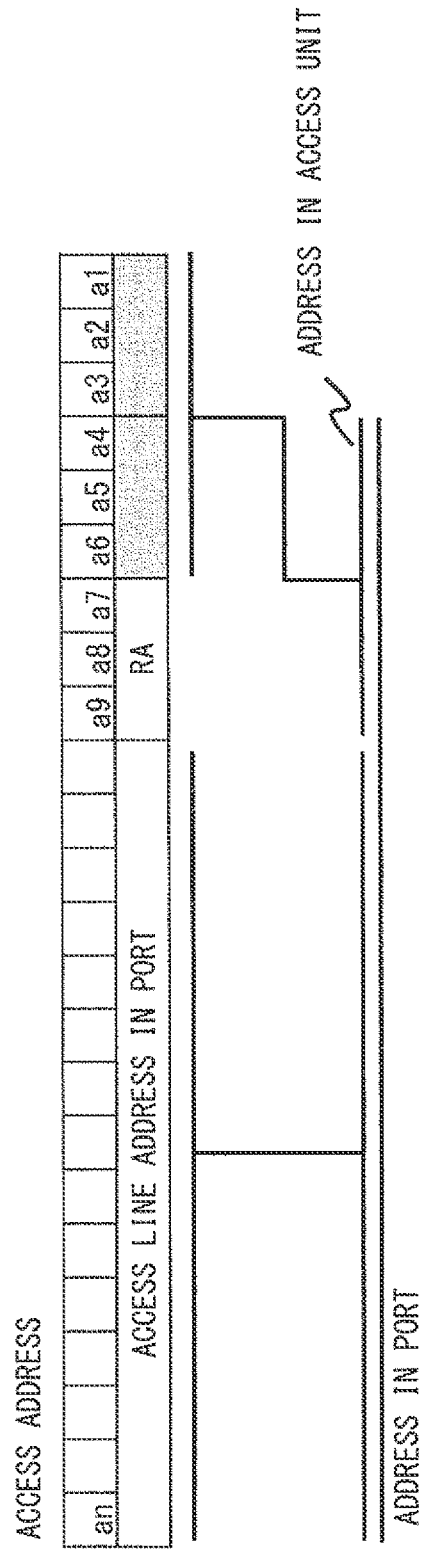
FIG. 12 is a view showing an example a data structure of an access address when the vector operation unit of the related art accesses the storage unit.

The block diagram of an information processing device 2 according to a second exemplary embodiment is shown in FIG. 7. As shown in FIG. 7, in the information processing device 2, the cache unit 31 of the information storage device 1 is removed, and the storage unit 20 is composed only of the main memory unit 21. Specifically, in the information processing device 2, the memory access control unit 40 directly accesses the main memory unit 21.

In such a case, discontinuous words are assigned in the access data width of the main memory unit 21 by which an access is made by one access unit. Accordingly, the memory access control unit 40 of the information processing device 2 can operate in the same procedure as the memory access control unit 40 of the information processing device 1. That is, the information processing device 2 can reduce the access time in a similar manner as the information processing device 1.

Note that the present invention is not limited to the above exemplary embodiments, but can be modified as appropriate without departing from the scope.

According to the information processing device, the memory access controller, and the address generation method of the present invention, it is possible to reduce the access time while using the storage unit with the access unit of a plurality of word lengths. While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing device comprising:
an operation unit configured to process one-word-length data per processing cycle, and to output an access request in synchronization with the processing cycle;
a storage unit comprising a plurality of connection ports and a plurality of memories configured to perform input/output processing with respect to the plurality of connection ports in a simultaneous parallel process,
wherein data with a plurality of word lengths act as an access unit for each of the connection ports; and
a memory access control unit configured to distribute, for each processing cycle, a plurality of access addresses corresponding to the access request received from the operation unit, and to generate an address in a port, including a spatially discontinuous word, utilizing one access unit for each of the connection ports.

2. The information processing device according to claim 1, wherein the memory access control unit comprises:
a routing address generation unit configured to generate a routing address for specifying a connection port which assigns the access address,
a conflict arbitration unit configured to perform conflict arbitration of the connection port for assigning each of the plurality of access addresses based on the routing address,
an address in port generation unit configured to generate the address in the port based on the access address input in a plurality of processing cycles of the information processing device, and
a crossbar unit configured to assign the address in the port to one of the plurality of connection ports according to a conflict arbitration process of the conflict arbitration unit.

3. The information processing device according to claim 1, wherein the memory access control unit is configured to generate the plurality of access addresses based on the access request.

4. The information processing device according to claim 3, wherein
the operation unit is a vector operation unit configured to output a vector element, a top element address, and distance information between elements as the access request, the distance information indicating a distance between adjacent vector elements, and
the address generation unit generates the plurality of access addresses based on the top element address and the distance information between elements.

5. The information processing device according to claim 1, wherein the plurality of connection ports of the storage unit are configured to be accessed in parallel from the memory access control unit.

6. The information processing device according to claim 1, wherein
the storage unit includes a cache unit provided for each of the connection ports, and a plurality of cache line widths each configured to store data of at least greater than or equal to one access unit, each cache line width being used as a unit to manage data, and
a plurality of pieces of data assigned to the discontinuous word are each stored to one cache line width of the cache unit.

7. An apparatus, comprising:
an operation unit configured to process one-word-length data per processing cycle, and to output an access request in synchronization with the processing cycle, and
a storage unit including a plurality of connection ports and a plurality of memories configured to perform input/output processing with respect to the plurality of connection ports in a simultaneous parallel process, and configured to generate an address in a port for each of the connection ports of the storage unit based on the access request between the operation unit and the storage unit, wherein data with a plurality of word lengths act as an access unit for each of the connection ports,
a routing address generation unit configured to generate a routing address for specifying the connection port to assign each of a plurality of access addresses corresponding to the access request;
a conflict arbitration unit configured to perform conflict arbitration of the connection port to assign the access address based on the routing address;
an address in port generation unit configured to generate the address in the port based on the access address input in a plurality of processing cycles of the memory access control device; and
a crossbar unit configured to assign the address in the port to one of the plurality of connection ports according to a conflict arbitration process of the conflict arbitration unit.

8. The apparatus according to claim 7, further comprising an address generation unit configured to generate the plurality of access addresses based on the access request.

9. An address generation method in an information processing device including:
outputting, with an operation unit configured to process one-word-length data per processing cycle, an access request in synchronization with the processing cycle;
using a plurality of memories to perform input/output processing with respect to a plurality of connection ports of a storage unit, in a simultaneous parallel process, wherein data with a plurality of word lengths act as an access unit for each of the connection ports;
generating the plurality of access addresses corresponding to the access request for each processing cycle of the operation unit; and
distributing the plurality of access addresses into the plurality of connection ports, and generating an address in a port including a spatially discontinuous word belonging to a different processing cycle of the operation unit, utilizing one access unit for each of the connection ports.

10. The address generation method according to claim 9, wherein:
   the storage unit includes a cache unit provided for each of the connection ports, and a plurality of cache line widths, each configured to store data at least greater than or equal to one access unit, each cache line width being used as a unit to manage data, and
   the plurality of pieces of data assigned to the discontinuous word each are stored to one cache line width of the cache unit.

* * * * *